United States Patent
Snead

(10) Patent No.: US 12,522,065 B2
(45) Date of Patent: Jan. 13, 2026

(54) ADJUSTABLE ACCELERATOR PEDAL STROKE

(71) Applicant: Toyota Motor Engineering & Manufacturing North America, Inc., Plano, TX (US)

(72) Inventor: Corey M. Snead, Howell, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 190 days.

(21) Appl. No.: 18/232,244

(22) Filed: Aug. 9, 2023

(65) Prior Publication Data
US 2025/0050732 A1    Feb. 13, 2025

(51) Int. Cl.
*B60K 26/02* (2006.01)
*B60K 26/04* (2006.01)
(Continued)

(52) U.S. Cl.
CPC .............. *B60K 26/02* (2013.01); *B60K 26/04* (2013.01); *B60K 2026/026* (2013.01);
(Continued)

(58) Field of Classification Search
CPC .. B60K 26/02; B60K 26/04; B60K 2026/026; B60K 2026/046; B60L 7/18;
(Continued)

(56) References Cited

U.S. PATENT DOCUMENTS

| 7,395,887 | B2 * | 7/2008 | Viergever | B60L 50/16 |
| | | | | 180/65.265 |
| 11,214,278 | B2 * | 1/2022 | Hoop | B60L 7/22 |

(Continued)

FOREIGN PATENT DOCUMENTS

| JP | 2006175942 A | 7/2006 |
| JP | 2021146777 A | 9/2021 |
| WO | WO-2024082766 A1 * | 4/2024 |

OTHER PUBLICATIONS

Machine Translation of WO2024082766A1—effective filing date of patent family is Oct. 20, 2022 (Year: 2024).*

(Continued)

*Primary Examiner* — Christian Chace
*Assistant Examiner* — Richard Edwin Geist
(74) *Attorney, Agent, or Firm* — Snell & Wilmer LLP

(57) ABSTRACT

Methods, systems, and apparatus for a regenerative braking and powertrain pedal system. The powertrain system includes an electric motor that is configured to generate regenerative energy and provide a regenerative braking torque. The powertrain system includes an electronic control unit coupled to the electric motor. The electronic control unit is configured to cause an accelerator pedal to rotate about its pivot point to increase a total available stroke in response to an energy recovery mode being activated. The electronic control unit is configured to control an amount of the regenerative braking torque to be applied using an accelerator pedal position. The electronic control unit is configured to cause the accelerator pedal to rotate about its pivot point to decrease the total available stroke in response to the energy recovery mode being deactivated.

20 Claims, 8 Drawing Sheets

(51) Int. Cl.
*B60L 7/18* (2006.01)
*B60W 20/00* (2016.01)

(52) U.S. Cl.
CPC ........... *B60K 2026/046* (2013.01); *B60L 7/18* (2013.01); *B60L 2250/26* (2013.01); *B60W 20/00* (2013.01)

(58) Field of Classification Search
CPC ............ B60L 2250/24; B60L 2250/26; B60L 2250/28; B60L 7/22; B60W 20/00
See application file for complete search history.

(56) References Cited

U.S. PATENT DOCUMENTS

| | | | |
|---|---|---|---|
| 11,498,429 B2* | 11/2022 | Crombez | B60W 10/184 |
| 2020/0180432 A1* | 6/2020 | Gauthier | B60W 30/18127 |
| 2022/0097533 A1 | 3/2022 | Treharne et al. | |
| 2022/0105925 A1 | 4/2022 | Naserian et al. | |
| 2022/0111844 A1 | 4/2022 | Kim et al. | |
| 2024/0157915 A1* | 5/2024 | Felch | B60L 7/14 |
| 2024/0399880 A1* | 12/2024 | Kim | B60L 3/108 |

OTHER PUBLICATIONS

Mehmet Ugras Cuma et al., Design and implementation of algorithms for one pedal driving in electric buses, Feb. 2021, http://www.sciencedirect.com/science/article/pii/S2215098620342750.

* cited by examiner

ADJUSTABLE ACCELERATOR PEDAL STROKE

BACKGROUND

Field

The present disclosure relates to hybrid/electric vehicles and energy regeneration drive systems for hybrid/electric vehicles.

Description of the Related Art

In vehicles with an electric powertrain (e.g., hybrid/electric vehicles), the electric motor may be used as a generator to charge the battery and provide electric braking. This allows the electric powertrain to recover some of the kinetic energy of the vehicle in order to recharge its batteries. For example, the electric motor generates a regenerative braking torque that applies a deceleration drive force that reduces the speed of the vehicle. Moreover, some vehicles are configurable or changeable between one-pedal driving (acceleration and deceleration are controlled with a single pedal) and two-pedal driving (acceleration is controlled with an accelerator pedal and deceleration is controlled with a brake pedal). In both modes, the pedal stroke remains the same. Accordingly, vehicle software must adapt for changes in torque/driveforce over pedal stroke when changing between modes.

Accordingly, it is desirable to provide systems, methods, and techniques for reliably and efficiently switching between one-pedal driving and two-pedal driving.

SUMMARY

In general, one aspect of the subject matter described in this disclosure may be embodied in a regenerative braking and powertrain system (or "powertrain system"). The powertrain system includes an accelerator pedal, an accelerator position sensor configured to detect a position of the accelerator pedal, an actuator operatively coupled to the accelerator pedal, and an electronic control unit electrically coupled to the actuator. The accelerator pedal is adjustable or rotatable between a first stroke range and a second stroke range. The first stroke range is between a first rotational position and a second rotational position. The second stroke range is between the first rotational position and a third rotational position. The electronic control unit is configured to control the actuator to move the accelerator pedal from the first rotational position to the third rotational position in response to receiving a first drive mode signal indicating that an energy recovery mode has been activated.

These and other embodiments may optionally include one or more of the following features. The second rotational position can be a fully depressed rotational position (also referred to as a fully engaged position). The accelerator pedal can be depressed from the third rotational position to the first rotational position with the actuator.

The electronic control unit can be further configured to control an amount of a regenerative braking torque to be applied in response to detecting the accelerator pedal moving from the first rotational position toward the third rotational position. The electronic control unit can be further configured to control an acceleration in response to detecting the accelerator pedal moving from the first rotational position toward the second rotational position. The electronic control unit can be further configured to control the actuator to move the accelerator pedal from the third rotational position to the first rotational position in response to receiving a second drive mode signal indicating that the energy recovery mode has been deactivated.

In response to the energy recovery mode being activated, the electronic control unit can be configured to control an acceleration and a deceleration based on the position of the accelerator pedal and a pedal map. In response to the energy recovery mode being deactivated, the electronic control unit can be configured to control the acceleration and the deceleration based on the position of the accelerator pedal and the same pedal map. The pedal map can include a mapping of a motor torque, an engine speed, and an accelerator pedal position.

The actuator can be configured as a stop that blocks the accelerator pedal from rotating past the first rotational position, when the energy recovery mode is deactivated, or the third rotational position, when the energy recovery mode is activated.

In another aspect, the subject matter may be embodied in a powertrain system including an accelerator pedal rotatable about a pivot between a released position and a fully engaged position, an actuator operatively coupled to the accelerator pedal, and an electronic control unit electrically coupled to the actuator. The electronic control unit is configured to receive a first drive mode signal indicating that an energy recovery mode has been activated. The electronic control unit is further configured to control the actuator to rotate the accelerator pedal about the pivot in response to receiving the first drive mode signal.

These and other embodiments may optionally include one or more of the following features. A total available stroke of the accelerator pedal can increase in response to the actuator rotating the accelerator pedal about the pivot in a first rotational direction. The total available stroke of the accelerator pedal can decrease in response to the actuator rotating the accelerator pedal about the pivot in a second rotational direction.

The powertrain system can further include an electric motor that is configured to generate regenerative energy and provide a regenerative braking torque and an inverter coupled to the electric motor and configured to control the regenerative braking torque of the electric motor. The electronic control unit is coupled to the inverter. The electronic control unit can be configured to determine an amount of the regenerative braking torque to be applied based on a pedal map and an accelerator pedal position, and provide a signal that indicates an amount of regenerative braking torque to be applied.

The powertrain system can further include an accelerator pedal sensor configured to detect the accelerator pedal position. The powertrain system can further include a memory configured to store the pedal map having a mapping of a motor torque, an engine speed, and an accelerator pedal position. The electronic control unit can be coupled to the memory and configured to select the pedal map from a plurality of pedal maps in response to receiving the first drive mode signal indicating that the energy recovery mode has been activated.

In another aspect, the subject matter may be embodied in a method of controlling a deceleration force of a vehicle. The method includes determining, by a processor, that an energy recovery mode is activated. The method further includes controlling, by the processor, an actuator to cause an accelerator pedal to rotate to increase a total available stroke of the accelerator pedal to include a first stroke range corresponding to an acceleration of the vehicle and a second stroke range corresponding to a deceleration of the vehicle. The method further includes controlling, by the processor, the vehicle to accelerate when the accelerator pedal is moving in the first stroke range between a first position to a fully engaged position. The method further includes controlling, by the processor, the vehicle to decelerate when the accelerator pedal is moving in the second stroke range between the first position to a fully released position.

These and other embodiments may optionally include one or more of the following features. The method can further include controlling, by the processor, an amount of regenerative braking torque while the vehicle is decelerating. The method can further include detecting an accelerator pedal position, wherein the amount of regenerative braking torque is determined, at least in part, based upon the accelerator pedal position. The method can further include determining, by the processor, that the energy recovery mode is deactivated, and controlling, by the processor, the actuator to cause the accelerator pedal to rotate to decrease the total available stroke of the accelerator pedal to eliminate the second stroke range.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, methods, devices, and/or vehicles for implementing a selectively adjustable accelerator pedal that changes its rotational position to provide a regenerative braking torque when an energy recovery mode is activated. Aspects and/or embodiments are directed to adjusting or changing the amount of accelerator pedal stroke available to the user based on whether the energy recovery mode is activated or deactivated. When the energy recovery mode is activated, a longer pedal stroke is provided compared to a shorter pedal stroke when the energy recovery mode deactivated. Particular embodiments of the subject matter described in this disclosure may be implemented to realize one or more of the following advantages. Adjusting the pedal stroke allows the control software to avoid changing the torque/driveforce to accelerator pedal relationship when switching between the energy recovery drive modes (i.e., the energy recovery mode activated and the energy recovery mode deactivated). The powertrain system can utilize the same pedal map when the energy recovery mode is activated (also referred to as a one-pedal driving) and when the energy recovery mode is deactivated. The pedal map varies the motor torque and the corresponding drive force to provide the operator with a smooth operation of the vehicle. When the energy recovery mode is activated, the regenerative braking torque and the corresponding deceleration drive force can be controlled with a single accelerator pedal. Moreover, it is not required for the powertrain system to switch between pedal maps when switching between the energy recovery mode on and the energy recovery mode off.

The powertrain system may utilize an electromechanical actuator to rotate an accelerator pedal about its pivot point to increase a total available stroke range (when the energy recovery mode is activated) or decrease the total available stroke range (when the energy recovery mode is deactivated). When the energy recovery mode is activated, the powertrain system can utilize a first stroke range of the accelerator pedal for controlling acceleration of the vehicle and a second stroke range of the accelerator pedal for controlling regenerative braking torque. When the energy recovery mode is activated, the second stroke range of the accelerator pedal can be eliminated using the actuator (i.e., the actuator can act as a mechanical stop to prevent the accelerator pedal from rotating within the second stroke range) such that the accelerator pedal only rotates within the first stroke range.

Figure 1:
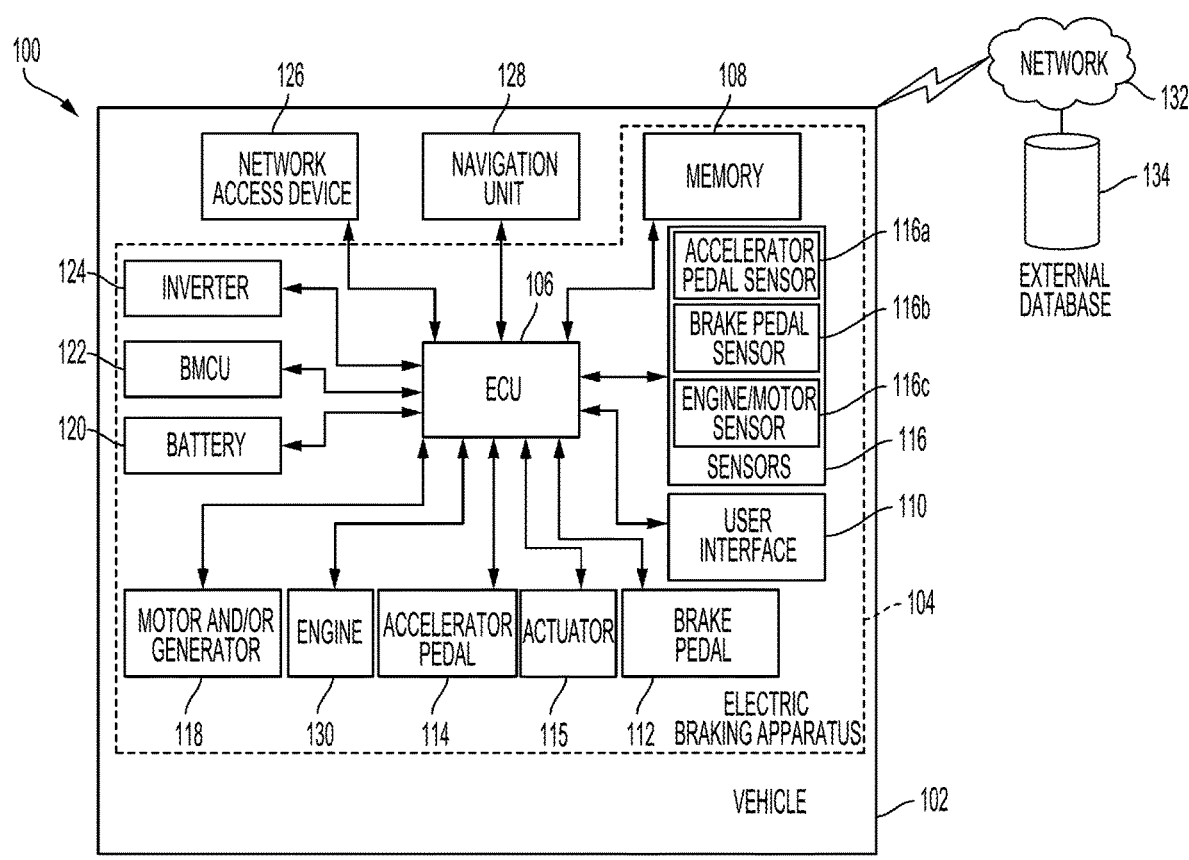
FIG. 1 is a block diagram of an example regenerative braking and powertrain system according to an aspect of the invention.

FIG. 1 is a block diagram of a regenerative braking and powertrain system 100 (also referred to as a powertrain system). The powertrain system 100 may include a braking apparatus 104 that may retrofit, couple to, include, or be included within a vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of electric/hybrid vehicle. Other examples of vehicles include bicycles, trains, planes, or boats, and any other form of conveyance that is capable of transportation. The vehicle 102 may be semi-autonomous or autonomous.

The powertrain system 100 monitors user input and adjusts, controls, or manages the electric motor or regenerative braking torque (hereinafter referred to as "regenerative braking torque") that is applied and that corresponds to a deceleration drive force to reduce or retard the movement of the vehicle during deceleration and/or coasting of the vehicle 102. The powertrain system 100 can use a pedal map to adjust or control the amount of regenerative braking torque rather than a pedal map that applies a fixed or constant regenerative braking torque that corresponds to a fixed or a constant deceleration drive force. This provides for smoother operation of the vehicle 102 and a more operator friendly "feel" during regenerative braking and may train the driver to brake less frequently, which reduces the wear and tear to the brake pads and other brake and vehicle components.

The powertrain system 100 may have an electric braking apparatus (or "braking apparatus") 104. The braking apparatus 104 may be within the vehicle 102. The braking apparatus 104 may be within, coupled to or otherwise connected to the vehicle 102 and/or connected to other vehicle components. The braking apparatus 104 may include one or more processors, such as an electronic control unit (ECU) 106 or other processor and a memory 108. The braking apparatus 104 may include or be coupled to other vehicle components including a user interface 110, the brake pedal 112, the accelerator pedal 114, one or more sensors 116, the inverter 124, the engine 130, the battery management control unit 122, the battery 120 and/or the motor and/or generator 118. In some implementations, the braking apparatus 104 may include or be coupled to other components of the vehicle 102, such as the network access device 126 and/or the navigation unit 128.

The braking apparatus 104 may include an ECU 106. The ECU 106 may be implemented as a single ECU or as multiple ECUs. The ECU 106 may be electrically coupled to some or all of the other components within the vehicle 102, such as the motor and/or generator 118, the engine 130, the battery 120, the inverter 124, the battery management control unit (BMCU) 122, the memory 108, the network access device 126 and/or one or more sensors 116. The ECU 106 may include one or more processors or controllers specifically designed for monitoring user input and/or controlling the inverter 124 and/or the motor and/or generator 118 to adjust or control the regenerative braking torque and corresponding deceleration drive force. The ECU 106 may be coupled to the memory 108.

The memory 108 may be coupled to the ECU 106 and store instructions that the ECU 106 executes. The memory 108 may include one or more of a Random Access Memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106 or other processor. For example, the memory 108 can store a pedal map for use by the ECU 106 in controlling acceleration and/or deceleration (e.g., regenerative braking torque) of the vehicle based upon at least one of an accelerator pedal position and/or an engine speed.

The braking apparatus 104 may include a user interface 110. The braking apparatus 104 may display one or more notifications and/or alerts. The one or more notifications may notify the user of the amount of regenerative braking or regenerative braking torque that is being applied. The one or more notification may include the amount of regenerative energy that is being generated and/or the amount that the brake pedal 112 is depressed. The user interface 110 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 110 may receive user input that may include configuration settings for one or more user preferences that indicate the amount of regenerative braking to be applied during deceleration or coasting of the vehicle 102.

The braking apparatus 104 may include a brake pedal 112 and/or an accelerator pedal 114 of the vehicle 102. The brake pedal 112 when depressed may apply the brakes and cause the vehicle 102 to slow down and/or stop. The accelerator pedal 114 may control an amount of energy, such as gas or electrical energy, that is fed to the engine 130 or the motor and/or generator 118 to control the speed of the vehicle 102.

The braking apparatus 104 may include one or more sensors 116. The one or more sensors 116 include an accelerator pedal sensor 116a, a brake pedal sensor 116b and/or an engine/motor speed sensor 116c. The accelerator pedal sensor 116a detects or measures a position of the accelerator pedal 114 and may detect or measure a rate of change in the position of the accelerator pedal 114. The brake pedal sensor 116b detects or measures a position of the brake pedal 112 and may detect or measure a rate of change in the position of the brake pedal 112. The brake pedal sensor 116b may provide to an inverter the range of brake pedal stroke where regeneration may be maximized. The engine/motor speed sensor 116c may measure the engine/motor speed of the engine 130 and/or the motor and/or generator 118.

The motor and/or generator 118 may convert electrical energy into mechanical power, such as torque, and may convert mechanical power into electrical energy, such as via regenerative braking. The motor and/or generator 118 may be coupled to the battery 120 via the inverter 124. The motor and/or generator 118 may convert the energy from the battery 120 into mechanical power, and may provide energy back to the battery 120, for example via regenerative braking. The inverter 124 may convert direct current (DC) from the battery 120 into alternative current (AC) for the motor and/or generator 118 to power or move the wheels of the vehicle 102. The inverter 124 may convert the AC from the motor and/or generator 118 and that is produced via regenerative braking to DC to store in the battery 120. The wheels of the vehicle 102 may create torque to move the motor and/or generator 118 to provide the AC to the inverter 124 to convert into DC to be stored in the battery 120, e.g., when coasting or decelerating. The inverter 124 may control the variable regenerative braking torque of the electric motor that decelerates the vehicle 102 and the corresponding variable deceleration drive force.

In some implementations, the vehicle 102 may include one or more additional power generation devices such as the engine 130 or a fuel cell stack (not shown). The engine 130 combusts fuel to provide power instead of and/or in addition to the power supplied by the motor and/or generator 118.

The battery 120 may be coupled to the motor and/or generator 118 and may provide electrical energy to and receive electrical energy from the motor and/or generator 118. The battery 120 may include one or more rechargeable batteries.

The BMCU 122 may be coupled to the battery 120 and may control and manage the charging and discharging of the battery 120. The BMCU 122, for example, may measure, using battery sensors, parameters used to determine the state of charge (SOC) of the battery 120. The BMCU 122 may control the battery 120 to maintain a reserve power explicitly for providing a sudden burst of electrical energy to be converted into power for the transmission to drive or move the multiple wheels of the vehicle 102.

The powertrain system 100 may include a network access device 126. The network access device 126 may be coupled to or included within the braking apparatus 104. The network access device 126 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 126 may transmit data to and receive data from the entities and/or components via a network 132. The network 132 may be a Dedicated Short-Range Communication (DSRC) network, a local area network (LAN), a wide area network (WAN), a cellular network, the Internet, or combination thereof, that connects, couples and/or otherwise communicates among the multiple entities.

The powertrain system 100 may include or be coupled to an external database 134, such as via the network 132. A database is any collection of pieces of information that is organized for search and retrieval, such as by a computer or a processor, and the database may be organized in tables, schemas, queries, reports, or any other data structures. A database may use any number of database management systems. The external database 134 may include a third-party server or website that stores or provides information. The information may include real-time information, periodically updated information, or user-inputted information. A server may be a computer or a processor in a network that is used to provide services, such as accessing files or sharing peripherals, to other computers in the network.

The external database 134 may be a navigational map database that includes navigational map information. The navigational map information may include weather features, such as precipitation including ice, snow, or rain, and/or road features, such as highways, roadways, dirt roads, inclines, off-ramps, on-ramps, stop, yield or other traffic signals or signs or changes in gradation in the roadways that may affect driver behavior patterns or affect when a vehicle may coast, decelerate, and/or accelerate.

The powertrain system 100 may include a navigation unit 128. The navigation unit 128 may be integral to the vehicle 102 or a separate unit coupled to the vehicle 102. In some implementations, the vehicle 102 may include a Global Positioning System (GPS) unit (not shown) for detecting location data and date/time information instead of the navigation unit 128. In that regard, the ECU 106 may perform the functions of the navigation unit 128 based on data received from the GPS unit. At least one of the navigation unit 128 or the ECU 106 may predict or propose a route set that includes a starting location and a destination location. The navigation unit 128 or the ECU 106 may perform navigation functions. Navigation functions may include, for example, route and route set prediction, providing navigation instructions, and receiving user input such as verification of predicted routes and route sets or destinations.

The navigation unit 128 may provide and obtain navigational map information. The navigational map information may include a timestamp, a current location, a direction of travel, one or more road features, a starting location, a destination location and/or a route between the starting location or current location and the destination location of the vehicle 102 and may include a memory (not shown) for storing route data. The navigation unit 128 may receive data from other sensors capable of detecting data corresponding to location information. For example, the other sensors may include a gyroscope or an accelerometer.

The powertrain system 100 may include an energy recovery drive mode. In the energy recovery drive mode, the speed of the vehicle may be increased in response to increasing a depressed position of the accelerator pedal 114 while releasing the accelerator pedal 114 results in braking the vehicle 102 via regenerative braking through the motor and/or generator 118. More specifically, the vehicle 102 may be slowed or braked via releasing the accelerator pedal 114 alone without an application or depression of the brake pedal 112. The powertrain system 100 can be selectively switched between the energy recovery drive mode and a two-pedal drive mode (i.e., the energy recovery drive mode can be activated or deactivated), where in the two-pedal drive mode (i.e., when the energy recovery drive mode is deactivated) the accelerator pedal 114 controls acceleration of the vehicle 102 and the brake pedal 112 controls braking or deceleration of the vehicle 102. The vehicle 102 may include a user interface 110, such as control panel, touch screen, push button, etc. that is in communication with the ECU 106, whereby a user can activate and deactivate the energy recovery mode. The ECU 106 may be configured to activate and deactivate the energy recovery driving mode based on an operator-selected input from the user interface 110.

The powertrain system 100 of the present disclosure includes an actuator 115 operatively coupled to the accelerator pedal 114. The ECU 106 may be electrically coupled to the actuator 115 for controlling a position and/or state of the actuator 115. The actuator 115 can control and/or limit a stroke of the accelerator pedal 114. Without the adjustable accelerator pedal stroke features of the present disclosure, when switching between the two-pedal mode and the energy recovery mode, the powertrain system 100 would require an adjustment to the pedal map used to control the amount of energy that is fed to the engine 130 or the motor and/or generator 118 for controlling the speed of the vehicle 102 based on the position of the accelerator pedal 114. Accordingly, the control software would have to adapt for the change in torque/drive force over the accelerator pedal stroke depending on the mode (e.g., the energy recovery mode activated or deactivated) of the powertrain system 100. The present disclosure provides apparatus, systems, and methods for switching between the energy recovery mode being activated and the energy recovery mode being deactivated without the control software having to adapt for the change in torque/drive force over the accelerator pedal stroke, thereby improving controllability of the powertrain torque/drive force. Accordingly, the same pedal map used to control the amount of energy that is fed to the engine 130 or the motor and/or generator 118 based upon the accelerator pedal position can be used in both energy recovery and two-pedal drive modes.

Figure 2A:
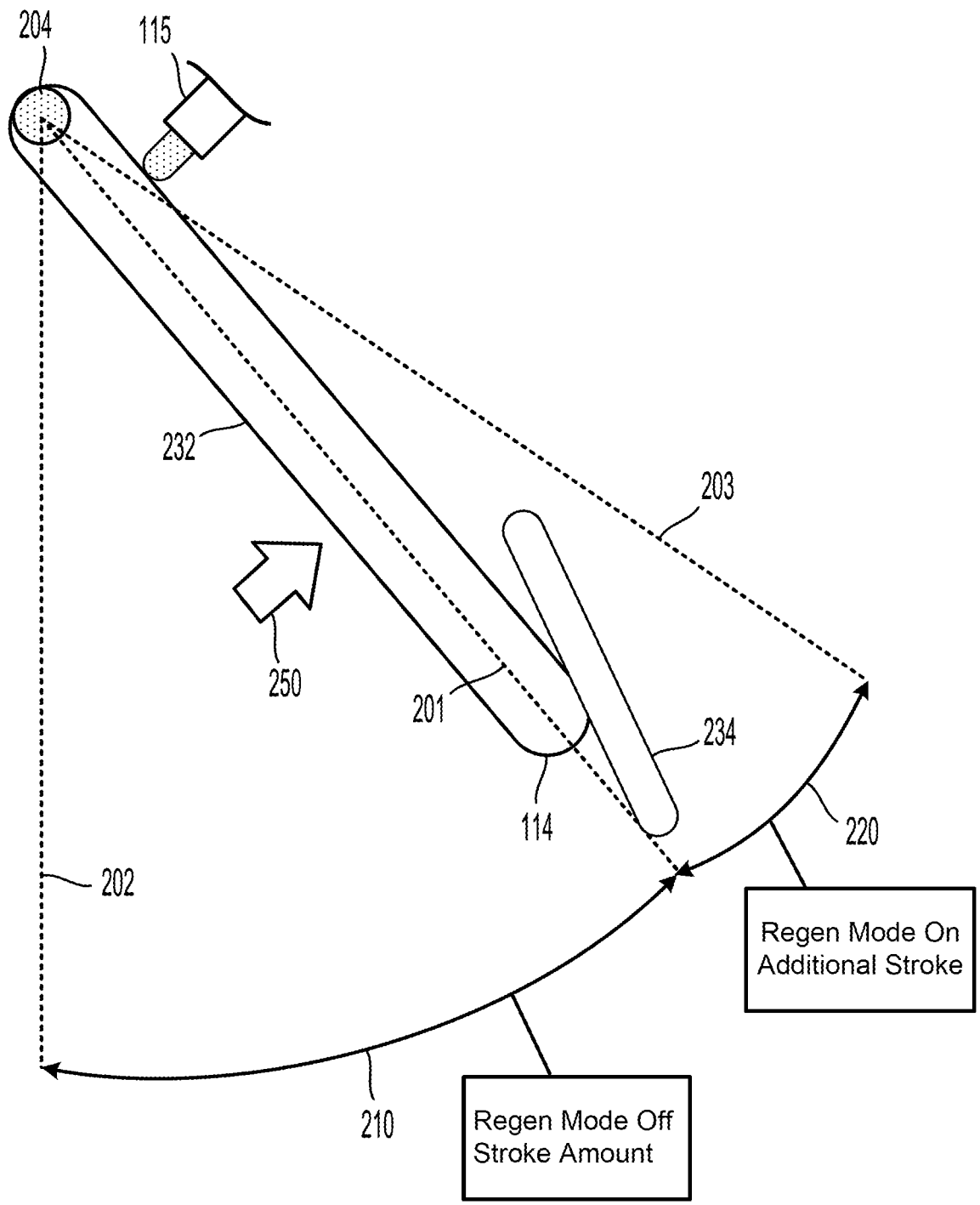
FIG. 2A is a schematic view of an example adjustable accelerator pedal rotated to a fully released position corresponding to an energy recovery mode deactivated according to an aspect of the invention.

FIG. 2A is a schematic view of an example accelerator pedal 114 in a first position when the energy recovery mode is deactivated (e.g., in two-pedal mode). The accelerator pedal 114 can include a pedal arm 232 having a distal end and a proximal end, where a pedal pad 234 (e.g., a foot pad) is coupled to the distal end. The pedal arm 232 is configured to rotate or pivot about an axis (e.g., a pivot 204) when an external force is applied or released from the pedal pad 234 to move the pedal arm 232 between a fully released position (also referred to herein as a home position, a third position 203, or the first position 201, depending on a state or a position of the actuator 115), where there is no external force applied to the pedal pad 234, and a plurality of depressed positions that move further away from the fully released position based on the greater amount of external force exerted onto the pedal pad 234 until a full travel position (also referred to herein as a fully depressed position, a fully engaged position, or a second position 202) is reached. The accelerator pedal 114 can rotate about the pivot 204 when depressed by a user's foot. When energized, the actuator 115 causes the accelerator pedal 114 to rotate about the same pivot 204 to the first rotational position 201.

The actuator 115 causes the accelerator pedal 114 to rotate to a first rotational position 201, whereby a stroke of the accelerator pedal 114 is limited to a first stroke range 210 (e.g., between the first rotational position 201 and a fully depressed rotational position 202 (also referred to herein as a second position)). The actuator 115 can be configured as a pedal arm stop. For example, the actuator 115 can be energized to cause an actuator piston to extend and rotate the accelerator pedal 114—e.g., against a spring tension 250 acting on the accelerator pedal 114—to the first position 201. Accordingly, in various embodiments, at least one spring is positioned in contact with the pedal arm 232 to bias the pedal arm 232 to the fully released position. The ECU 106 can control positive torque/drive force to accelerate the vehicle 102 in the first stroke range 210. The first position 201 can correspond to 0% acceleration and the second position 202 can correspond to 100% acceleration. In another aspect, the first position 201 can correspond to between about 0%-10% acceleration and the second position 202 can correspond to between about 90%-100% acceleration.

When the energy recovery mode is deactivated, the full stroke (i.e., the first stroke range 210) of the accelerator pedal 114 controls only acceleration of the vehicle. Braking of the vehicle is controlled by the brake pedal 112 (see FIG. 1). Accordingly, the powertrain system 100 can be referred to as being in two-pedal mode when the energy recovery mode is deactivated.

Figure 2B:
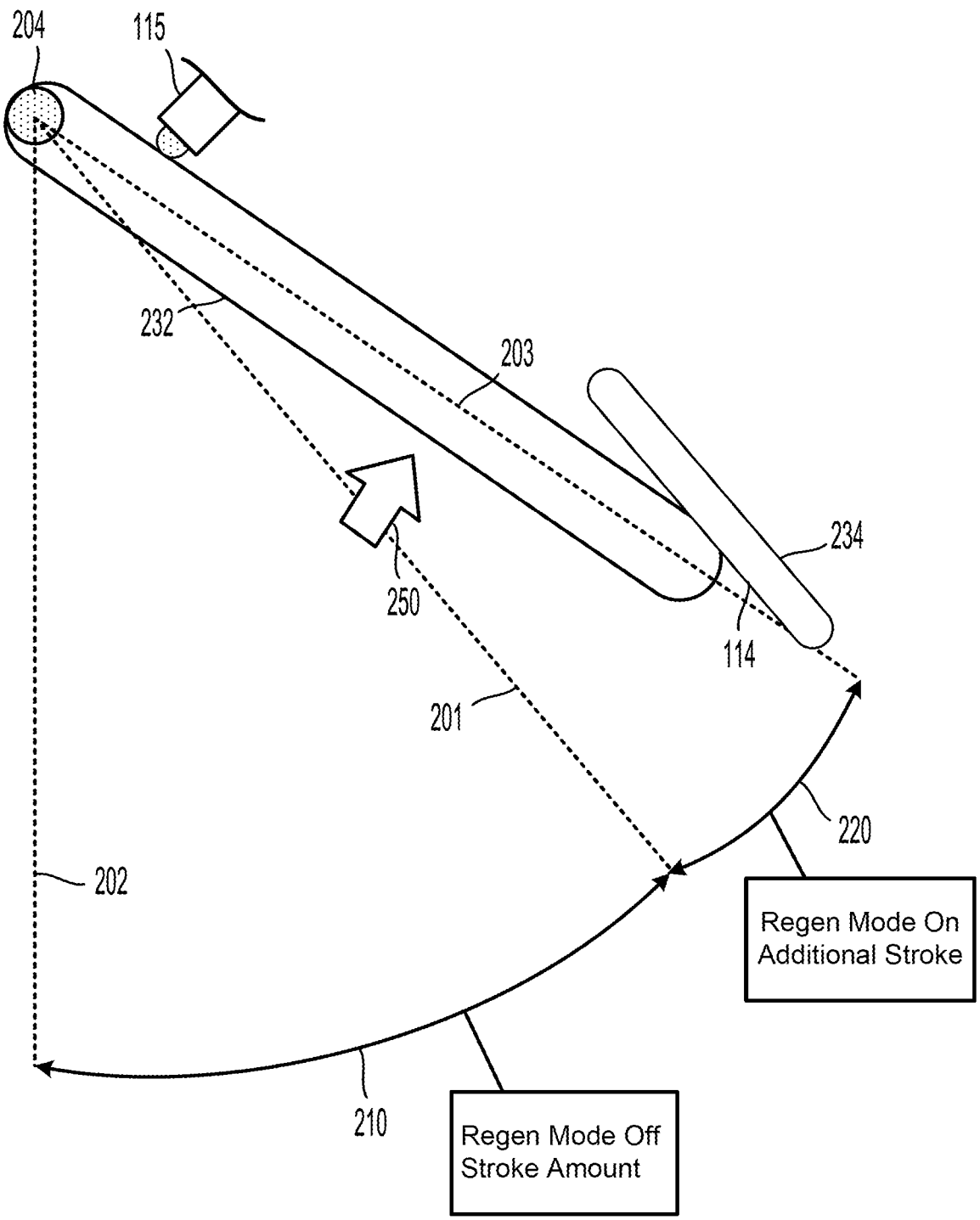
FIG. 2B is a schematic view of the example adjustable accelerator pedal rotated to a fully released position corresponding to an energy recovery mode activated according to an aspect of the invention.

FIG. 2B is a schematic view of the example accelerator pedal 114 in a second position when the energy recovery mode is activated. In the energy recovery mode, the actuator 115 can disengage from the accelerator pedal 114 to allow the accelerator pedal 114 to rotate to a third rotational position 203 (e.g., a fully released position) beyond the stroke range 210. Stated differently, in the energy recovery mode, the accelerator pedal 114 can rotate away from the fully depressed/second position 202, beyond the first rotational position 201, to the third rotational position 203, thereby defining an additional, second stroke range 220. Accordingly, the accelerator pedal 114 can rotate between the third rotational position 203 and the fully depressed/second position 202 in the energy recovery mode. The ECU 106 can receive a first drive mode signal indicating that the energy recovery mode has been activated (e.g., via the user interface 110) and, in response, the ECU 106 can control the actuator 115 to move the accelerator pedal 114 from the third rotational position 203 to the first rotational position 201. The ECU 106 can send a control signal to the actuator 115 to cause the actuator 115 to retract to allow the accelerator pedal 114 to rotate about pivot 204 toward the third position 203. For example, the actuator 115 can be deenergized to cause an actuator piston to retract, thereby allowing the accelerator pedal 114 to rotate from the first rotational position 201 toward the third rotational position 203. The spring tension 250 acting on the accelerator pedal 114 can cause the accelerator pedal 114 to rotate to the third rotational position 203—e.g., when a user is not depressing the accelerator pedal 114. The ECU 106 can control negative torque/drive force to decelerate the vehicle 102 in the second stroke range 220. Accordingly, a single pedal map can be used in both energy recovery mode and two-pedal mode, whereby the actuator 115 limits the accelerator pedal 114 to the first stroke range 210 in two-pedal mode (see FIG. 2A) and the actuator 115 allows the accelerator pedal 114 to rotate past the first stroke range 210 into the additional, second stroke range 220 in the energy recovery mode. In this manner, the actuator 115 can decrease the total available stroke range (i.e., limited to the first stroke range 210) of the accelerator pedal 114 in response to the energy recovery mode being deactivated. Conversely, the actuator 115 can increase the total available stroke range (i.e., increased to include the first and second stroke ranges 210, 220) of the accelerator pedal 114 in response to the energy recovery mode being activated.

The first position 201 can correspond to 0% deceleration and the third position 203 can correspond to 100% deceleration. In another aspect, the first position 201 can correspond to between about 0%-10% deceleration and the third position 203 can correspond to between about 90%-100% deceleration. Accordingly, the powertrain system 100 controls the magnitude of regenerative deceleration based upon the position of the accelerator pedal 114 when the energy recovery mode is activated. In some embodiments, the actuator 115 can be retracted to the fully released position of the accelerator pedal 114 at a location between the first position 201 and the third position 203 to mechanically limit the amount of regenerative torque applied by the powertrain system 100. In other embodiments, the actuator 115 is retracted to the fully released position of the accelerator pedal 114 at the third position 203 and the amount of regenerative torque applied by the powertrain system 100 (e.g., via motor and/or generator 118) can be limited by control logic of the powertrain system 100. For example, it may be desirable to limit the amount of regenerative torque (i.e., negative torque or decelerating torque) depending on the speed of the vehicle 102.

In various embodiments, in the energy recovery mode, the third rotational position 203 is a neutral position of the accelerator pedal 114 (i.e., a position of the accelerator pedal 114 without user input). As the user depresses the accelerator pedal 114, the accelerator pedal 114 strokes or rotates through the second stroke range 220 and, once the accelerator pedal 114 has rotated through the entirety of the second stroke range 220, into the first stroke range 210. Accordingly, the accelerator pedal 114 is depressed (e.g., rotated downward and/or forward) when rotating from the third position 203 to the first position 201. Similarly, the accelerator pedal 114 is depressed (e.g., rotated downward and/or forward) when rotating from the first position 201 to the second position 202.

Figure 3:
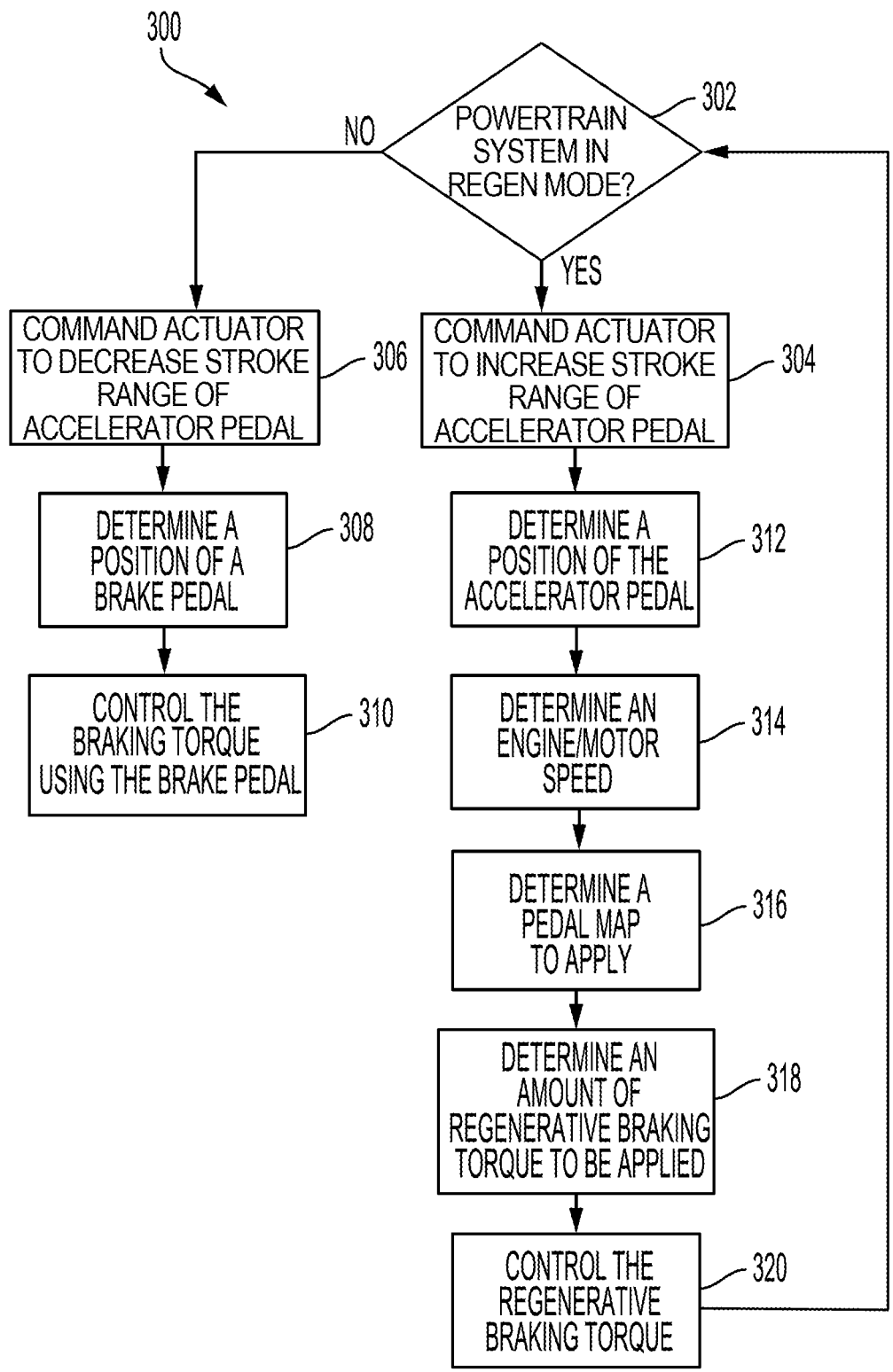
FIG. 3 is a flow diagram of an example process for controlling a regenerative braking torque that corresponds to a deceleration drive force using the powertrain system of FIG. 1 according to an aspect of the invention.

FIG. 3 is a flow diagram of a process 300 for controlling a regenerative braking torque that corresponds to a deceleration drive force when the vehicle 102 is decelerating or coasting. One or more computers or one or more data processing apparatuses, for example, the ECU 106 of the powertrain system 100, appropriately programmed, may implement the process 300.

The braking apparatus 104 can determine whether the energy recovery mode is activated (302). If the energy recovery mode is activated, the ECU 106 can command the actuator 115 to increase a stroke range of the accelerator pedal 114, for example as illustrated in FIG. 2B (304). For example, the actuator 115 can move the accelerator pedal 114 to the third position 203. If the energy recovery mode is deactivated, the ECU 106 can command the actuator 115 to decrease a total available stroke range of the accelerator pedal 114, for example as illustrated in FIG. 2A (306). For example, the actuator 115 can move the accelerator pedal 114 to the first position 201. The braking apparatus 104 detects, obtains or otherwise determines a position of a brake pedal 112 (308). The powertrain system 100 detects, obtains or otherwise determines the position of the brake pedal 112 using the brake pedal sensor 116b. The brake pedal sensor 116b may detect the position of the brake pedal 112 over a period of time and indicate whether the brake pedal 112 is released, partially engaged and/or fully engaged. Moreover, the brake pedal sensor 116b may detect the percentage or amount that the brake pedal 112 is released, partially engaged and/or fully engaged. The braking apparatus 104 can control the braking torque (e.g., regenerative braking torque and/or mechanical braking torque) based upon the position of the brake pedal (310).

The braking apparatus 104 detects, obtains or determines a position of an accelerator pedal 114 (312). The braking apparatus 104 detects, obtains or determines the position of the accelerator pedal 114 using the brake pedal sensor 116b. The accelerator pedal sensor 116a may detect the position of the accelerator pedal 114 over a period of time and indicate whether the accelerator pedal 114 is released, partially engaged, and/or fully engaged. Moreover, the accelerator pedal sensor 116a may detect the percentage or amount that the accelerator pedal 114 is released, partially engaged, and/or fully engaged. The braking apparatus 104 may use the position of the accelerator pedal 114 to determine whether to apply an acceleration torque or a regenerative braking torque when the energy recovery mode is activated.

When the energy recovery mode is activated, the braking apparatus 104 can control the vehicle acceleration and the vehicle deceleration using the accelerator pedal position: though it should be understood that the brake pedal position can provide additional braking as needed for safety purposes. For example, when the braking apparatus 104 determines that the brake pedal 112 is partially engaged or fully engaged, the braking apparatus 104 may cause the vehicle 102 to decelerating using mechanical braking torque and/or regenerative braking torque. When the braking apparatus 104 determines that the brake pedal 112 is in the released positioned and the accelerator pedal 114 is in the released position, the braking apparatus 104 may determine that the vehicle is coasting and/or decelerating due to regenerative braking torque. Otherwise, when the braking apparatus 104 determines that the brake pedal 112 is released and the accelerator pedal 114 is depressed the braking apparatus 104 may control regenerative braking torque (when the accelerator pedal is in the second stroke range 220) and may further control acceleration/driveforce torque (when the accelerator pedal is in the first stroke range 210).

The braking apparatus 104 may detect, obtain or determine an engine/motor speed of the vehicle 102 (314). The braking apparatus 104 may use the engine/motor speed sensor 116c to determine the engine/motor speed of the vehicle 102. The engine/motor speed may be the rotating speed of the engine 130 and/or the motor and/or generator 118, which may affect the amount of regenerative braking torque necessary to slow or reduce the speed of the vehicle 102.

Figure 4A:
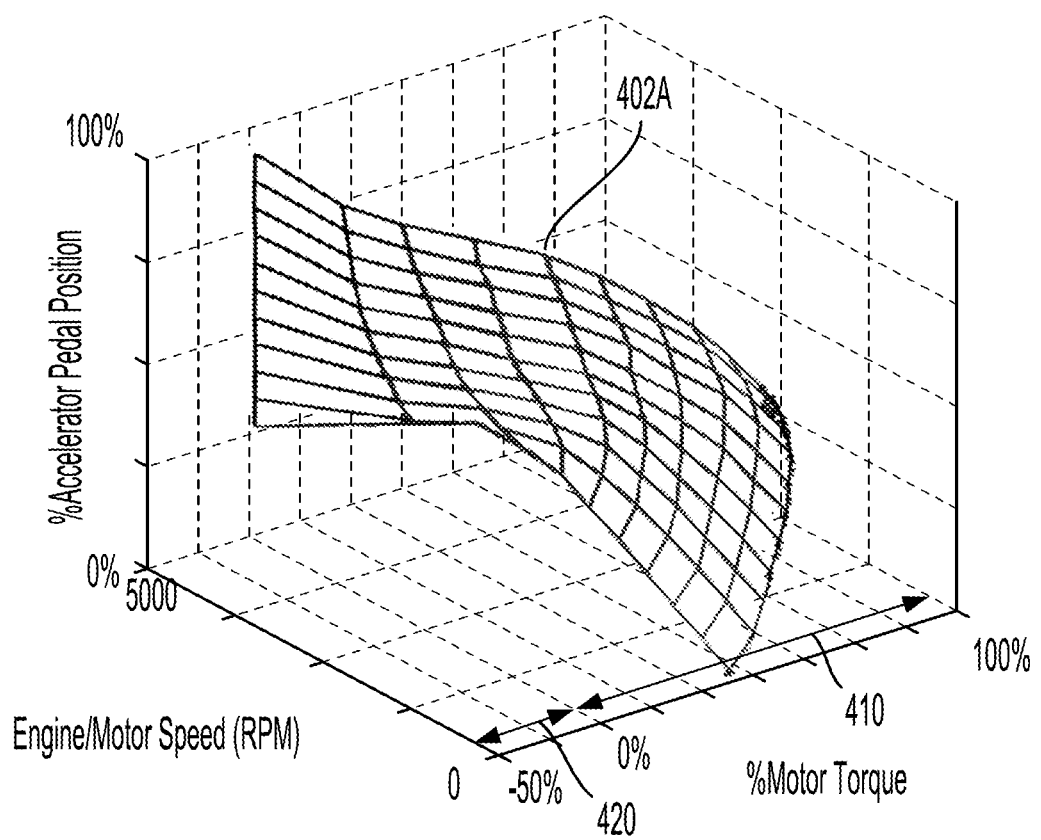
FIG. 4A shows an example pedal map used by the powertrain system of FIG. 1 to determine the regenerative braking torque according to an aspect of the invention.

The braking apparatus 104 can obtain or determine a pedal map to apply to determine the amount of engine braking torque (316). The pedal map can be stored in the memory 108. In various embodiments, the braking apparatus 104 uses the same pedal map in the energy recovery mode that the braking apparatus 104 uses when the energy recovery mode is deactivated. For example, the memory 108 may store a single pedal map, for example as shown in FIG. 4A, that has a first section 410 corresponding to the first stroke range 210 of the accelerator pedal 114 and a second section 420 corresponding to the second stroke range 220 of the accelerator pedal 114. When the energy recovery mode is deactivated, the second section 420 of the pedal table is not used since the stroke of the accelerator pedal 114 is mechanically blocked by the actuator 115 from entering the second stroke range 220. The braking apparatus 104 can also be configured to ignore or disable the second section 420 of the pedal table when the energy recovery mode is deactivated so as to prevent inadvertent regenerative braking torque. Conversely, when the energy recovery mode is activated, the second section 420 of the pedal table is enabled when the stroke of the accelerator pedal 114 enters the second stroke range 220.

Figure 4B:
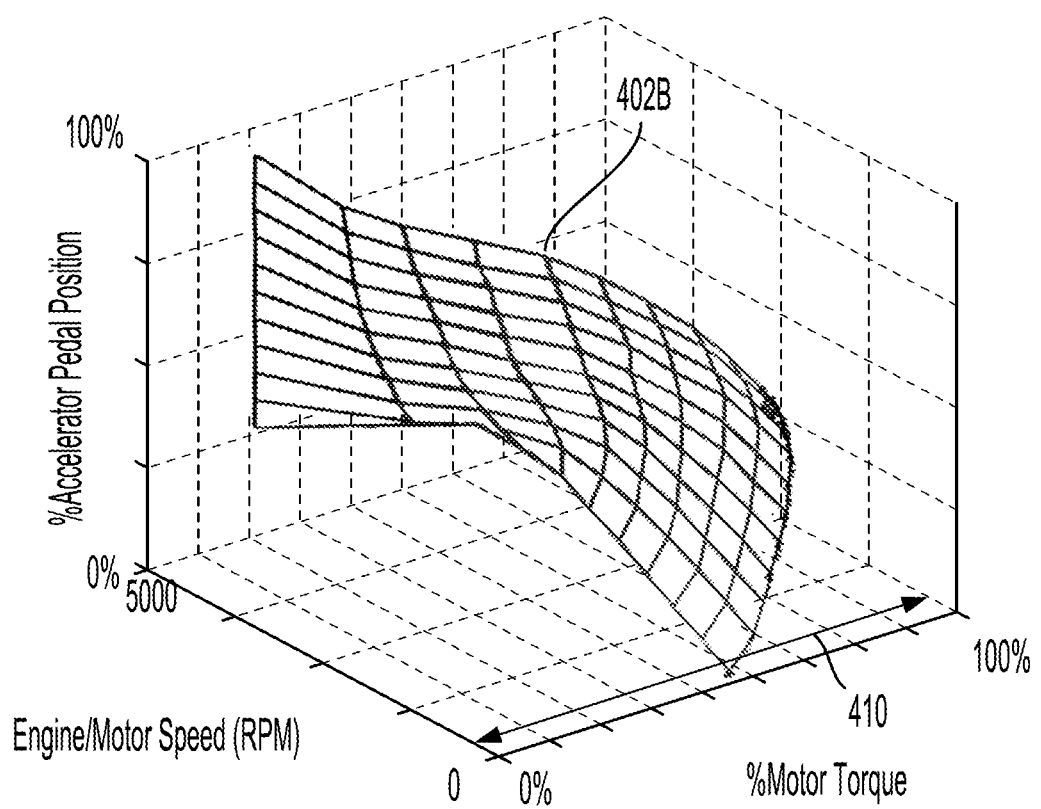
FIG. 4B shows example pedal maps used by the powertrain system of FIG. 1 to determine the regenerative braking torque according to an aspect of the invention.

In various embodiments, the braking apparatus 104 may obtain and/or determine the pedal map from among multiple pedal maps stored in the memory 108. For example, the memory 108 can further store a pedal map, for example as shown in FIG. 4B, that corresponds only to the first stroke range 210 of the accelerator pedal 114 (i.e., and not to the second stroke range 220). The braking apparatus 104 can use the pedal map 402b when the energy recovery mode is deactivated and the accelerator pedal 114 is mechanically blocked by the actuator 115 from entering the second stroke range 220, and can use the pedal map 402a when the energy recovery mode is activated. Each of the pedal maps 402a and 402b may have the same mapping of the regenerative braking torque, the engine/motor speed and the brake pedal position, except that the second section 520 is omitted in the pedal map 402b. In this manner, the pedal map 402b prevents inadvertent regenerative braking, for example in the event of a faulty accelerator pedal sensor 116a, when the energy recovery mode is disabled. Step 316 can be omitted when the same pedal map 402a is used for both driving modes.

The braking apparatus 104 can determine an amount of regenerative braking torque to be applied (318). The braking apparatus 104 may determine the amount of regenerative braking torque based on the engine/motor speed, the pedal map, and/or the position of the accelerator pedal 114, which corresponds to an amount of braking force. Given the amount of braking force or the accelerator pedal 114 and the engine/motor speed, the braking apparatus 104 may map the braking force and the engine/motor speed to a regenerative braking torque to be applied using the pedal map. When the energy recovery mode is activated, the braking apparatus 104 may determine the amount of regenerative braking torque based the position of the accelerator pedal 114 alone, even without operation of the brake pedal 112 (i.e., a single pedal (the accelerator pedal 114)) can be used to operate acceleration and deceleration.

The pedal map maps the engine/motor speed and the position of the accelerator pedal 114 with an amount of regenerative braking torque to be applied. The engine/motor speed may be directly correlated with the amount of regenerative braking torque, and the position of the accelerator pedal 114 may be inversely correlated with the amount of regenerative braking torque. For example, as the engine/motor speed of the vehicle 102 increases, the amount of regenerative braking torque to be applied increases (assuming the position of the accelerator pedal 114 is constant). And as the engine/motor speed of the vehicle 102 decreases, the amount of regenerative braking torque to be applied decreases (assuming the position of the accelerator pedal 114 is constant). In another example, as the position of the accelerator pedal 114 decreases to become released or disengaged, the amount of regenerative braking torque to be applied increases (assuming the engine/motor speed is constant). And as the position of the accelerator pedal 114 increases to become more engaged, the amount of regenerative braking torque to be applied decreases (assuming the engine/motor speed is constant).

Once the braking apparatus 104 determines the amount of regenerative braking torque to be applied, the braking apparatus 104 controls the regenerative braking torque based on the determined amount (320). For example, after the ECU 106 determines the amount of regenerative braking torque to be applied, the ECU 106 causes the inverter 124 to control the motor and/or generator 118 based on the determined amount of regenerative braking torque.

The ECU 106 may switch the inverter 124 on and off to control the amount of AC that is converted to DC to be stored in the battery 120 while simultaneously controlling the regenerative braking torque that is generated to slow the speed or motion of the vehicle 102. The ECU 106 may control the frequency, the duty cycle, or the switching ratio of the inverter 124 between the on and off position and/or percentage of time that the inverter 124 is in the on or off position. For example, the ECU 106 may control the frequency and/or the duration of the switching ratio of the inverter 124 so that DC is only converted from the AC and regenerative braking torque is generated and applied when the inverter 124 is on. As the amount of time that the inverter 124 is in the on-position increases, the amount of regenerative braking torque and the amount of regenerative braking energy increases because the motor and/or generator 118 generates regenerative braking energy that may be provided to the battery 120 via the inverter 124 and generates the regenerative braking torque that is applied to slow the vehicle 102. And as the amount of time that the inverter 124 is in the off-position increases, the amount of regenerative braking torque and the amount of regenerative braking energy decreases because the motor and/or generator 118 does not generate the regenerative braking energy via the inverter 124 and does not provide the regenerative braking torque for the deceleration force.

In some implementations, the ECU 106 may control the amount of energy that is provided by the inverter 124 to control the amount of regenerative braking torque. As the amount of energy that the inverter 124 provides increases, the amount of regenerative braking torque and the amount of regenerative braking energy increases. And as the amount of energy that the inverter 124 provides decreases, the amount of regenerative braking torque and the amount of regenerative braking energy decreases. This allows the braking apparatus 104 to control the amount of regenerative braking torque, which results in the slowing or deceleration of the vehicle 102. The braking apparatus 104 continues to monitor the state of the vehicle 102, such as the accelerator pedal 114, to continue to control the regenerative braking torque through the trip. Moreover, the braking apparatus 104 may continue to monitor whether the energy recovery mode is activated or deactivated (302).

The actuator 115 can be a linear actuator (e.g., an electric linear actuator) or a rotary actuator (e.g., an electric rotary actuator) suitable for rotating a position of the accelerator pedal 114. The actuator 115 can be an electrical actuator, a hydraulic actuator, a pneumatic actuator, a magnetic actuator, or a mechanical actuator.

Figure 5A:
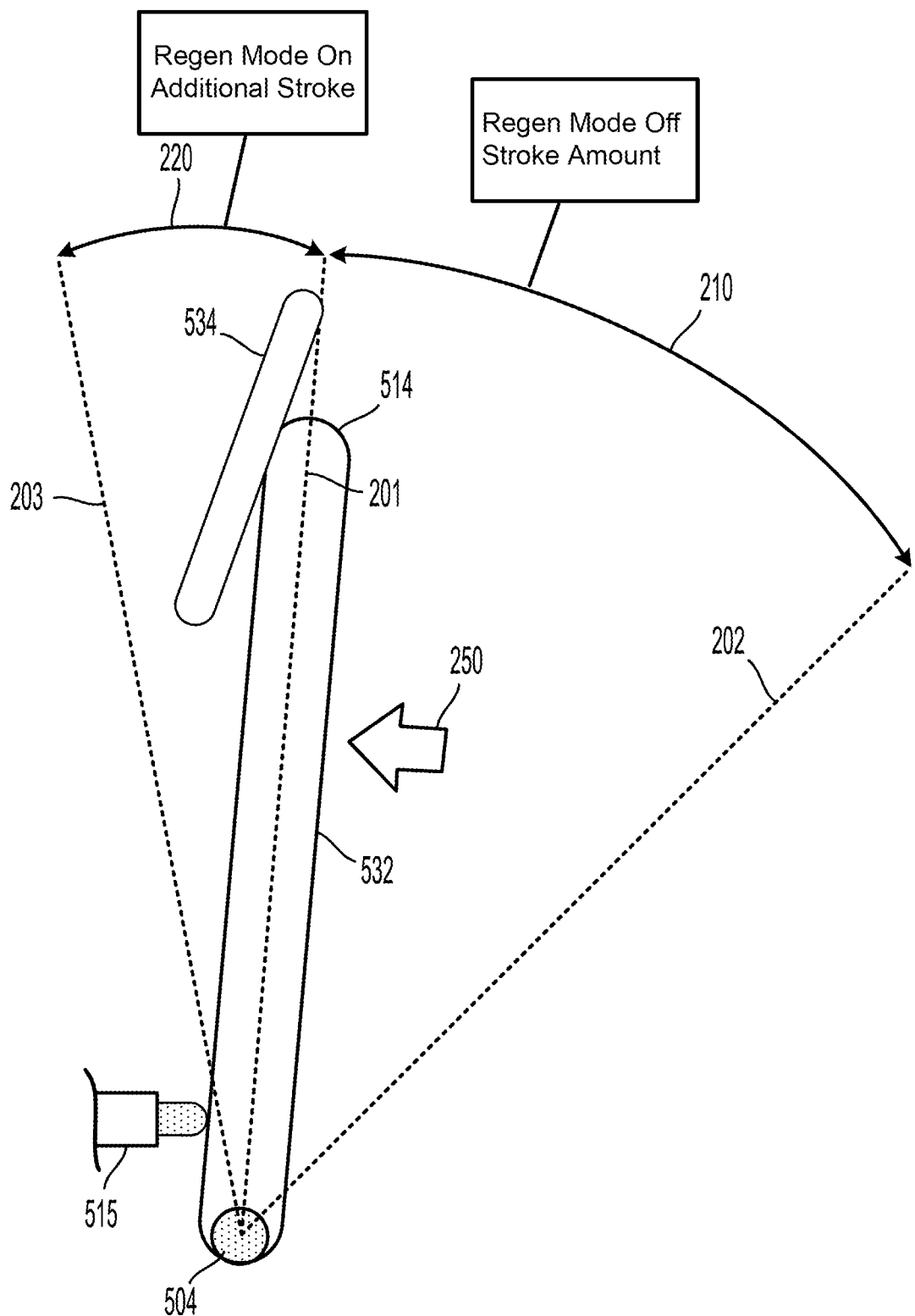
FIG. 5A is a schematic view of an example adjustable accelerator pedal rotated to a fully released position corresponding to an energy recovery mode deactivated according to an aspect of the invention.

FIG. 5A is a schematic view of an example floor-mounted accelerator pedal 514 in a first position when the energy recovery mode is deactivated (e.g., in two-pedal mode). The accelerator pedal 514 can include a pedal arm 532 having a distal end and a proximal end, where a pedal pad 534 (e.g., a foot pad) is coupled to the distal end. The pedal arm 532 is configured to rotate or pivot about an axis (e.g., pivot 504). The accelerator pedal 514 can be a floor-mounted accelerator pedal. Stated differently, the accelerator pedal 514 can include a floor-mounted pivot 504.

Figure 5B:
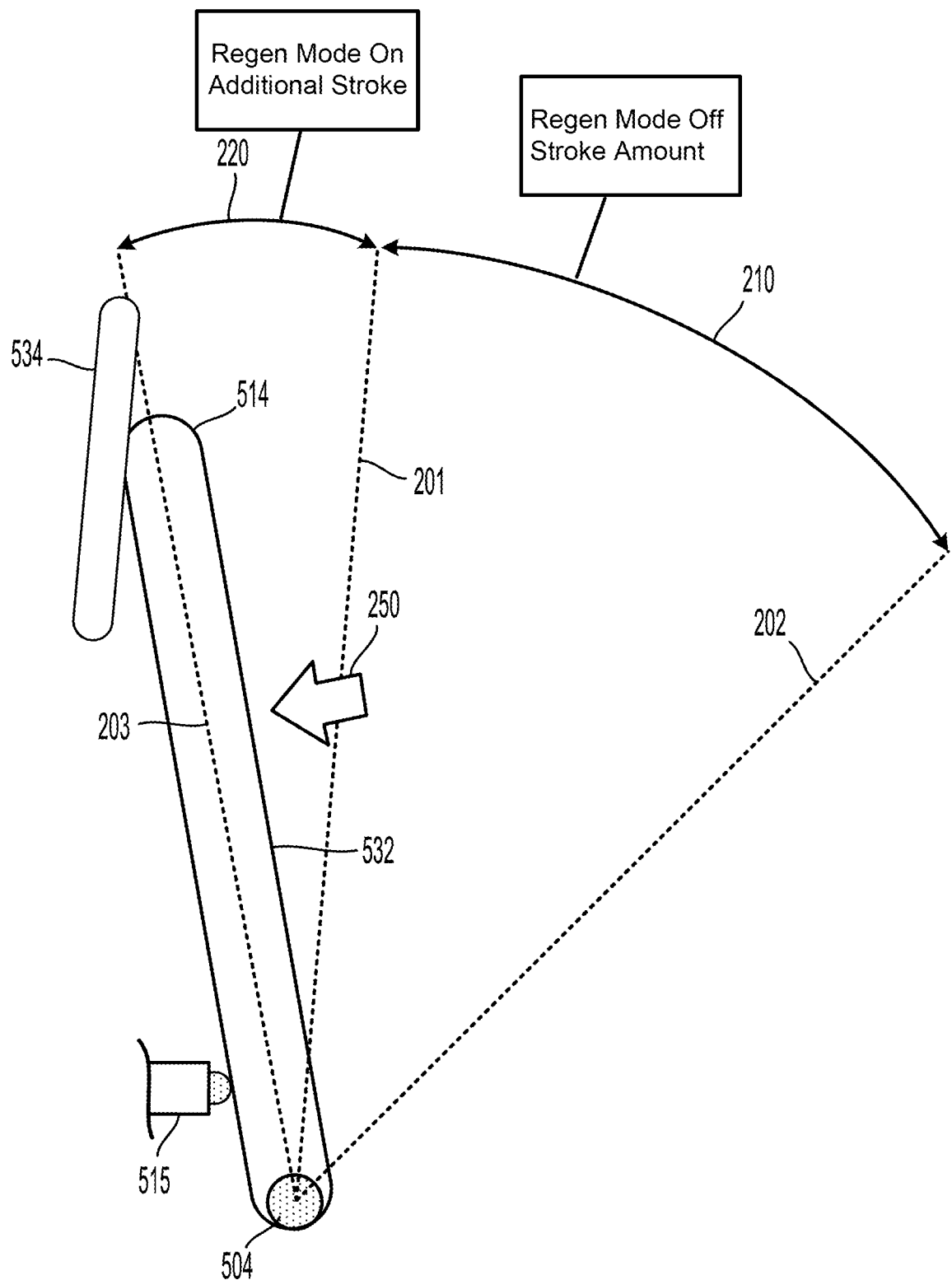
FIG. 5B is a schematic view of the example adjustable accelerator pedal rotated to a fully released position corresponding to an energy recovery mode activated according to an aspect of the invention.

FIG. 5B is a schematic view of the floor-mounted accelerator pedal 514 in a second position when the energy recovery mode is activated. With respect to FIG. 5A and FIG. 5B, elements with like element numbering, as depicted in FIG. 2A and FIG. 2B, are intended to be the same or similar and will not necessarily be repeated for the sake of clarity.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:
1. A powertrain system, comprising:
a brake pedal;
an accelerator pedal operable in a one-pedal driving mode, wherein the accelerator pedal is configured to control both acceleration and regenerative braking of a vehicle, and a two-pedal driving mode, wherein the accelerator pedal is configured to control acceleration of the vehicle and the brake pedal is configured to control deceleration of the vehicle, the accelerator pedal is rotatable between a first stroke range and a second stroke range, the first stroke range is between a first rotational position and a second rotational position, and the second stroke range is between the first rotational position and a third rotational position, and the first rotational position is disposed between the second rotational position and the third rotational position;
an accelerator position sensor configured to detect a position of the accelerator pedal;
an actuator configured to limit a stroke of the accelerator pedal;
an electronic control unit electrically coupled to the actuator and configured to:
receive a first drive mode signal indicating that an energy recovery mode has been activated in the one-pedal driving mode;
control the actuator to move the accelerator pedal from the first rotational position to the third rotational position to allow the accelerator pedal to operate in the second stroke range in response to receiving the first drive mode signal;
receive a second drive mode signal indicating that the energy recovery mode has been deactivated in the two-pedal driving mode;
control the actuator to move the accelerator pedal from the third rotational position to the first rotational position to stop the accelerator pedal from operating in the second stroke range in response to receiving the second drive mode signal; and
control both acceleration and deceleration of the vehicle in the one-pedal driving mode and in the two-pedal driving mode using a same pedal map, without switching between different pedal maps when the energy recovery mode is activated or deactivated.

2. The powertrain system of claim 1, wherein the second rotational position is a fully depressed rotational position.

3. The powertrain system of claim 1, wherein the accelerator pedal is depressed from the third rotational position to the first rotational position with the actuator.

4. The powertrain system of claim 1, wherein the electronic control unit is further configured to control an amount of a regenerative braking torque to be applied in response to detecting the accelerator pedal moving from the first rotational position toward the third rotational position.

5. The powertrain system of claim 1, wherein the electronic control unit is further configured to control an acceleration in response to detecting the accelerator pedal moving from the first rotational position toward the second rotational position.

6. The powertrain system of claim 1, wherein:
in response to the energy recovery mode being activated, the electronic control unit is configured to control an acceleration and a deceleration based on the position of the accelerator pedal and the pedal map; and
in response to the energy recovery mode being deactivated, the electronic control unit is configured to control the acceleration and the deceleration based on the position of the accelerator pedal and the same pedal map.

7. The powertrain system of claim 6, wherein the pedal map includes a mapping of motor torque, engine speed, and accelerator pedal position.

8. The powertrain system of claim 6, wherein the electronic control unit is configured to disable a portion of the pedal map corresponding to the second stroke range when the energy recovery mode is deactivated, and to enable the portion of the pedal map corresponding to the second stroke range when the energy recovery mode is activated.

9. The powertrain system of claim 1, wherein the actuator is configured as a stop that blocks the accelerator pedal from rotating past the first rotational position, when the energy recovery mode is deactivated, or the third rotational position, when the energy recovery mode is activated.

10. The powertrain system of claim 1, wherein in response to the actuator moving the accelerator pedal from the third rotational position to the first rotational position, the accelerator pedal is disabled from controlling regenerative braking of the vehicle.

11. The powertrain system of claim 1, wherein the actuator comprises a mechanical stop that, in response to the second drive mode signal, physically prevents the accelerator pedal from entering the second stroke range, thereby ensuring that the same pedal map is maintained without remapping torque to pedal position.

12. The powertrain system of claim 1, wherein the actuator is configured to adjust the position of the accelerator pedal only in response to a drive mode signal indicating a transition between the one-pedal driving mode and the two-pedal driving mode, and not based on available regenerative braking torque.

13. A powertrain system, comprising:
a brake pedal;
an accelerator pedal operable in a one-pedal driving mode, wherein the accelerator pedal is configured to control both acceleration and regenerative braking of a vehicle, and a two-pedal driving mode, wherein the accelerator pedal is configured to control acceleration of the vehicle and the brake pedal is configured to control deceleration of the vehicle, the accelerator pedal is rotatable about a pivot between a released position and a fully engaged position;
an actuator configured to limit a stroke of the accelerator pedal;
an electronic control unit electrically coupled to the actuator and configured to:
receive a first drive mode signal indicating that an energy recovery mode has been activated in the one-pedal driving mode;
control the actuator to rotate the accelerator pedal about the pivot in a second rotational direction to decrease a total available stroke of the accelerator pedal in response to receiving the first drive mode signal;
receive a second drive mode signal indicating that the energy recovery mode has been deactivated in the two-pedal driving mode;
control the actuator to rotate the accelerator pedal about the pivot in a first rotational direction to increase the total available stroke of the accelerator pedal in response to receiving the second drive mode signal; and
control both acceleration and deceleration of the vehicle in the one-pedal driving mode and in the two-pedal driving mode using a same pedal map, without switching between different pedal maps when the energy recovery mode is activated or deactivated.

14. The powertrain system of claim 13, further comprising:
an electric motor that is configured to generate regenerative energy and provide a regenerative braking torque;
an inverter coupled to the electric motor and configured to control the regenerative braking torque of the electric motor, the electronic control unit is coupled to the inverter; and
the electronic control unit is configured to:
determine an amount of the regenerative braking torque to be applied based on the pedal map and an accelerator pedal position when the energy recovery mode has been activated, and
provide a signal that indicates an amount of regenerative braking torque to be applied.

15. The powertrain system of claim 14, further comprising an accelerator pedal sensor configured to detect the accelerator pedal position.

16. The powertrain system of claim 15, further comprising a memory configured to store the pedal map having a mapping of motor torque, engine speed, and accelerator pedal position.

17. The powertrain system of claim 16, wherein the electronic control unit is coupled to the memory and configured to select the pedal map from a plurality of pedal maps in response to receiving the first drive mode signal indicating that the energy recovery mode has been activated.

18. A method of controlling a deceleration force of a vehicle, comprising:
determining, by a processor, that an energy recovery mode is activated in a one-pedal driving mode;
controlling, by the processor, an actuator to cause an accelerator pedal to rotate in a first rotational direction to increase a total available stroke of the accelerator pedal to include a first stroke range corresponding to an acceleration of the vehicle and a second stroke range corresponding to a deceleration of the vehicle;
controlling, by the processor, the vehicle to accelerate when the accelerator pedal is moving in the first stroke range between a first position to a fully engaged position;

controlling, by the processor, the vehicle to decelerate when the accelerator pedal is moving in the second stroke range between the first position to a fully released position;

determining, by the processor, that the energy recovery mode is deactivated in a two-pedal driving mode;

controlling, by the processor, the actuator to cause the accelerator pedal to rotate in a second rotational direction to decrease the total available stroke of the accelerator pedal to eliminate the second stroke range; and controlling, by the processor, both acceleration and deceleration of the vehicle in the one-pedal driving mode and in the two-pedal driving mode using a same pedal map that maps motor torque and accelerator pedal position, without switching between different pedal maps when the energy recovery mode is activated or deactivated.

19. The method of claim 18, further comprising controlling, by the processor, an amount of regenerative braking torque while the vehicle is decelerating.

20. The method of claim 19, further comprising detecting an accelerator pedal position, wherein the amount of regenerative braking torque is determined, at least in part, based upon the accelerator pedal position.

* * * * *